United States Patent
Hehl

[19]
[11] Patent Number: 5,539,650
[45] Date of Patent: Jul. 23, 1996

[54] KNOWLEDGE BASED METHOD OF CONTROLLING AN INJECTION MOLDING MACHINE

[76] Inventor: Karl Hehl, Arthur-Hehl-Strasse 32, W-7298 Lossburg 1, Germany

[21] Appl. No.: 72,948

[22] Filed: Jun. 8, 1993

[30] Foreign Application Priority Data

Jun. 12, 1992 [DE] Germany .......................... 42 19 259.5

[51] Int. Cl.$^6$ .................................................. G06F 19/00
[52] U.S. Cl. ..................... 364/476.05; 264/40.1; 364/468.15; 395/919; 425/149
[58] Field of Search ...................... 364/476, 468, 364/473, 188, 189, 191–193, 401, 402, 403, 512, 474.24; 395/919, 912, 904; 264/40.7; 425/149

[56] References Cited

U.S. PATENT DOCUMENTS

| | | | |
|---|---|---|---|
| 4,534,003 | 8/1985 | Manzione | 364/476 |
| 4,862,376 | 8/1989 | Ferriter et al. | 364/403 X |
| 4,939,668 | 7/1990 | Brown et al. | 395/919 X |
| 4,989,166 | 1/1991 | Akasaka et al. | 364/476 X |
| 5,119,307 | 6/1992 | Blaha et al. | 395/919 X |
| 5,195,029 | 3/1993 | Murai | 364/184 |
| 5,216,617 | 6/1993 | Kamiguchi et al. | 364/476 |
| 5,225,122 | 7/1993 | Inaba et al. | 264/40.1 |
| 5,260,866 | 11/1993 | Lisinski et al. | 364/468 X |
| 5,275,768 | 1/1994 | Inaba et al. | 264/40.1 |
| 5,280,425 | 1/1994 | Hogge | 364/402 |
| 5,316,707 | 5/1994 | Stanciu et al. | 364/476 X |
| 5,321,620 | 6/1994 | Tanaka et al. | 395/919 X |
| 5,350,546 | 9/1994 | Takeuchi et al. | 264/40.1 |
| 5,350,547 | 9/1994 | Yamaguchi et al. | 264/40.1 |

FOREIGN PATENT DOCUMENTS

| | | |
|---|---|---|
| 0257099 | 3/1988 | European Pat. Off. . |
| 4025221 | 2/1992 | Germany . |
| 61-5313 | 1/1986 | Japan . |
| 61-5314 | 1/1986 | Japan . |
| 62-170317 | 7/1987 | Japan . |
| 63-126715 | 5/1988 | Japan . |
| 3256093 | 11/1991 | Japan . |
| 4-37519 | 2/1992 | Japan . |

OTHER PUBLICATIONS

Patent Abstracts of Japan, vol. 16, No. 212 (ME–1250), May 19, 1992 (JP–4–37519).
Patent Abstracts of Japan, vol. 11, No. 186 (P–586), Jun. 16, 1987 (JP–62–014208).
Patent Abstracts of Japan, vol. 14, No. 237 (M–976) (4180), May 21, 1990 (JP–2–63712).
Patent Abstracts of Japan, vol. 14, No. 311 (M–0994), Jul. 4, 1990 (JP–2–103114).

*Primary Examiner*—Joseph Ruggiero
*Attorney, Agent, or Firm*—Spencer & Frank

[57] ABSTRACT

Computer based interactive control of a plastics injection molding machine during input of portions of a production sequence and configuration of an injection cycle, which is effected essentially before the onset of the injection molding process. For a mold guided by an operator, operating parameters required for a process sequence are input by way of an input unit into a computer based control unit storing these operating parameters. Subsequently, one or a plurality of injection cycles are implemented according to the stored operating parameters. A physically possible production sequence, as well as a production sequence that is structurally specific to the machine and the tool employed, including any peripheral devices provided at the respective machine or associated therewith, is determined with the control unit. An operator is provided with a selection of possible inputs of further portions of the production sequence that can be added to the existing portions and are compatible with the machine and the tool based on the determination.

19 Claims, 8 Drawing Sheets

KNOWLEDGE BASED METHOD OF CONTROLLING AN INJECTION MOLDING MACHINE

CROSS-REFERENCE TO RELATED APPLICATIONS

This application claims the priority of application Serial No. P 42 19 259.5 filed Jun. 12th, 1992 in Germany, the subject matter of which is incorporated herein by reference.

BACKGROUND OF THE INVENTION

1. Field of the Invention

The present invention relates to the field of process control, and in particular, to a knowledge-based method of controlling an injection molding machine production process wherein operating parameters required for the process sequence are input to a data processing unit by an operator and subsequently one or more injection cycles are implemented according to the stored operating parameters.

2. Background Information

In the past, before beginning the first injection cycle of a plastics molding process, an operator of a plastics injection molding machine used an input unit to input respective operating parameters into a data processing unit. The data processing unit furnished all the input masks i.e., screens or windows for data input) available for the injection molding machine on a data viewing device in succession without any provision for the making of a specific selection.

In other words, the prior system does not allow configuration of an injection cycle in advance. Instead, it offers all possible input masks for input data to the user, even if no input has to be made in one of the input masks because, for example, a particular step in the injection cycle, for which input might be necessary, is not implemented. With the expenditure of a great amount of time, respectively required input masks had to be given the necessary parameters.

This process resulted in a high frequency of input errors. For example, during this input, it could not be determined whether all sequential steps of an injection cycle followed one another in an appropriate manner. Further, even if it were desired, certain steps could not be performed several times, such as, for example, repeated opening or closing of a mold closing unit. Moreover, only the respective injection cycle could be input, without consideration of start-up and shut-down phases in a production sequence.

Therefore, the prior art method provided such a poor process overview that the machines could only be set up by expert, trained personnel with the expenditure of substantial amounts of time and effort.

Unexamined Published German Patent Application DE-OS 4,025,221 discloses a method of adjusting an injection molding machine based on empirically or systematically determined values. An optimization program is employed which contains basic knowledge about the rules of injection molding, and a range of characteristics composed of operating parameters.

However, this method is designed to optimize an injection molded object in the course of several injection cycles by adjusting and re-adjusting the machine, that is, the method is for quality control purposes. Therefore, those parameters that concretely influence the injection molded object are input, but not values that only influence the injection cycle itself, such as, for example., mold opening or ejection times.

Furthermore, the presence of peripheral devices and material supply are not considered in this method. The operator is able to influence only the computer aided design (CAD) simulated filling of the mold. Thus, this method begins only at a point where components are to be optimized, that is, after initial set up of the machine. This method is unable to contribute to increases in quality at the time when the injection molding machine is initially set up.

SUMMARY OF THE INVENTION

In order to overcome the above-mentioned problems and limitations, the present invention provides the following novel features and advantages.

It is an object of the present invention to provide a method wherein the setting up of the injection molding machine can be performed quickly while simultaneously reducing the frequency of errors in the input of parameters required for the injection molding process.

This is accomplished in one embodiment by determining with a control unit a physically possible production sequence as well as a production sequence that is structurally specific to the machine and the tool employed, including peripheral devices provided at the respective machine or associated therewith, and providing an operator with a selection of possible inputs of further portions of the production sequence that can be added to the existing portions and are compatible with the machine and the tool, based on the determination.

In this method, the configuration of the tool (mold) together with the basic rules of injection molding determines the number of setting parameters, not the versatility of the control system and the variety of installed injection molding machine components. An efficient and simultaneously error-free setting up of tools becomes possible.

Basic rules refers to rules reflecting knowledge which is known to one skilled in injection molding about the rules of injection molding. This knowledge may be fixedly implemented in an operating program, that is, the program is not able to learn additional knowledge, although of course the knowledge could be amended by the manufacturer of the injection molding machines by changing the programming, if necessary. These basic rules allow establishment of a logical sequence of steps. Therefore, these rules state, for example, which step is possible at all, when a first step is done, or which step could be inserted at all between two existing steps of one cycle. A rule therefore regulates the different possibilities of a sequence in an injection cycle.

By way of explanation why the variety of components does not determine the number of input parameters, consider the following example. Assuming the machine comprises several peripheral devices, e.g., cylinder heating, external heating or handling units, even so, these may not be used for each injection cycle. If the moldings are lenses, for example, a handling unit is needed but otherwise it is not. In those cases when the handling unit is needed, the handling unit has to be programmed to pick the moldings out of the mold and put them into places within fixed units. In this example, additionally the ejector will not be used, and therefore it will not be necessary to insert input parameters in an input screen for the ejector.

The data processing unit, operating in the background, creates a dynamically underlying decision tree structure which directly indicates to the operator the available possibilities and the risks involved with them. The operator is offered only concretely possible and appropriate selections within the scope of the input possibilities that are actually available. For example, it is not possible to let the mold close when the ejector is extended. In this way, the basic requirements for a freely configurable sequence of partial steps in an injection cycle are created, significantly improving the overview of the entire configuration of an injection cycle.

A further aspect of the method incorporates a knowledge base that permits the interactive assembly of an entire production sequence, which is stored for later operation of the machine and serves to control subsequent manufacturing steps. The selection of input possibilities is made available so that the injection cycle is freely configured on a data viewing device based on the knowledge of the possible injection cycles and the existing devices.

In another embodiment, the configuration of the injection cycle is effected on a single configuration mask displayed on the data viewing device. The operator is greatly aided since the entire cycle can be displayed on a single mask, that is, directly on the screen.

In a further embodiment, graphical, language independent symbols, e.g., icons, are employed to facilitate operation and give the operator a quick overview of the entire injection cycle. The configuration takes place by means of a symbol-guided selection of individual steps of an injection cycle and by means of the establishment of a hierarchical process sequence. The language independent symbols help an operator regardless of where the machine is being used, even, for example, in developing countries, to operate the machine after a brief introductory period. It is, therefore, not necessary to prepare extensive, multi-language documentation regarding the control of the machine. The method of course helps to accelerate the configuration of the injection cycle in that, as already mentioned, it proposes only ways that make sense in a particular case.

In another embodiment, after the configuration of the injection cycle, an input of parameters is possible only in the input masks required for the configured injection cycle.

In yet another embodiment, before the input of steps that are to take place simultaneously or successively, a plausibility check is made which, if necessary, prevents further input. Such a plausibility check, for example, makes the closing of the mold closing unit dependent on the retraction of the ejector so that the input always considers parts of the sequence that occur in parallel and those that occur earlier or later in the injection cycle.

According to another embodiment, a check for completion of the respective injection cycle is made. After the selection of a step in an injection cycle, at least the further steps necessary to complete the injection cycle are listed. A plausibility check for the completion of the injection cycle is thus enabled.

In one embodiment, the set-up of the injection molding machine is effected by means of a monitoring structure involving a higher-order tree structure for monitoring the operating parameters.

If configured according to another embodiment, processes occurring for the same length of time are displayed in an easily understood manner. It is thereby possible to freely select suitable steps for simultaneous or sequential occurrence from the computer selected steps within the respective time sequences. Motion sequences that occur simultaneously or successively are made available as a selection of possible inputs based on the resources made available by the machine. According to another aspect of the invention, the input of individual steps of the injection cycle can be repeated in successive motion sequences.

Only if the input injection cycle has been completed, as determined by the computer based method, are the masks required for this injection cycle displayed on the data viewing device so that the necessary operating parameters can be input. Once the injection process has begun, a quality control analysis can be performed.

The sequence control of any desired peripheral devices that are combined into a production cell called the "injection molding unit" can be incorporated directly in the process, such as, for example, handling, heating, sorting and stacking devices. Furthermore, a production sequence including injection cycles can be freely configured on the data viewing device to include process phases and terminating phases.

These and other objects and aspects of the invention are better understood with reference to the detailed description and accompanying drawings, and it will be understood that changes in the specific structure shown and described may be made within the scope of the claims without departing from the spirit of the invention.

BRIEF DESCRIPTION OF THE DRAWINGS

The invention will now be described in greater detail with reference to an embodiment thereof.

FIG. 2b illustrates an exemplary tree structure of possible steps in the configuration of FIG. 2a;

DETAILED DESCRIPTION OF THE PREFERRED EMBODIMENTS

Figure 1:
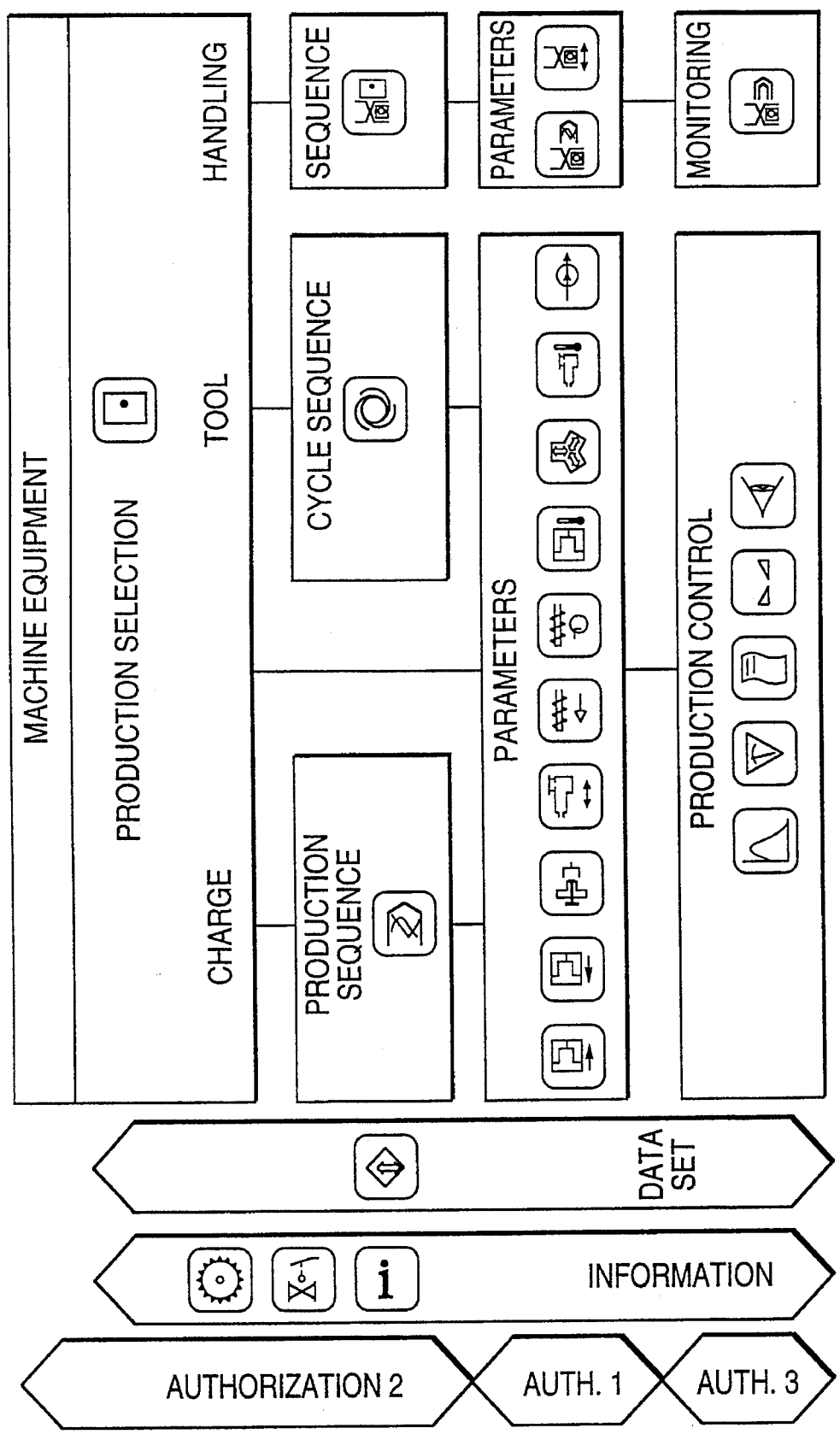
FIG. 1 is a hierarchical diagram of the overall control.

The invention will now be described in more detail by example with reference to the embodiments shown in the Figures. It should be kept in mind that the following described embodiments are only presented by way of example and should not necessarily be construed as limiting the inventive concept to any particular physical configuration or set sequence of steps.

In order to control and set up a production sequence including injection cycles in an injection molding machine with a control unit (FIG. 5), operating parameters must be input. Such input is effected by way of an input device, with the input operating parameters being stored by a data processing unit. The individual injection cycles are then performed according to these operating parameters. The data processing unit is informed, either by input from the operator or by means of sensors or reporting devices, which pieces of machine equipment are available with respect to the tool (mold), the injection molding machine or peripheral devices. Peripheral devices include, for example, handling, heating, sorting or stacking devices, that is, devices that are available in the machine or associated with it.

The input is effected in a manner that guides the operator, with the operator being able to input, by way of the input device, only those parameters for the sequence of injection cycle configurations which are appropriate based on a data base of knowledge of the physical process sequence, the structure and the capabilities of the machine and the tools, etc., and which can be incorporated in a compatible manner in already existing portions of the injection cycle. The control unit thus provides the operator with a selection of possible inputs. For the purpose of this input, an input device (FIG. 4) is provided having soft keys S, symbol keys 12a, which simultaneously serve as normal alpha-numeric keys 12, a cursor block 10 equipped with cursor keys 10a, as well as a block of numbers 11 so that parameters can also be put into input masks that are subordinate to and associated with a configuration mask.

Figure 5:
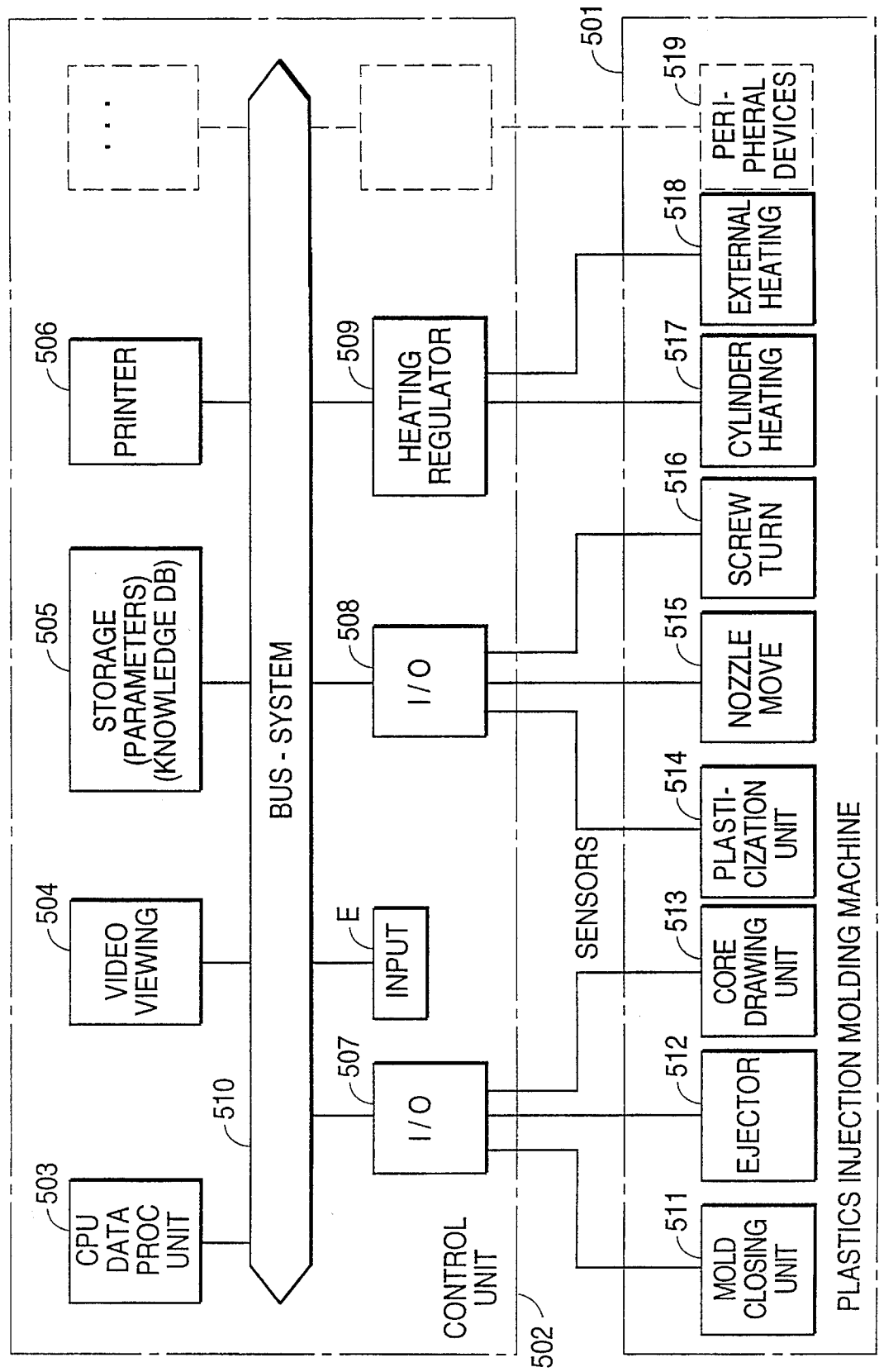
FIG. 5 is a block diagram representation of an injection molding machine with a control unit for implementing the disclosed method.

FIG. 1 shows the basic hierarchy of the control. The entire control is divided into three authorization stages which allow only skilled expert personnel input access at certain points in time within the production sequence or parts thereof. For example, in authorization stage 1 (AUTH. 1) it is only possible to input parameters, while in authorization stage 2, it is possible to input data with respect to, for example, machine equipment, cycle sequences, the production sequence or processing in peripheral devices. Authorization stage 3 serves to monitor the quality of the product by appropriate displays on the data viewing device or output on a printer (FIG. 5).

The authorization level of FIG. 1 intends to show the different authorizations user should have for entering data or input in certain levels. A person having access to authorization level 1 for entering input parameters has usually no access to authorization levels 2 and 3. On the other hand, a person having access to authorization levels 2 or 3 also has access to authorization level 1, and 1 and 2, respectively. Therefore, the authorization levels show the range of the blocks. The division into authorization stages shown in FIG. 1 is exemplary only and can be modified as desired with respect to its transitions. In all three stages, information about the ongoing injection cycle or its results can be called up, and complete data sets can be output by way of a data output device of the data processing device.

The authorization levels are freely displaceable, i.e, a person which has access to a higher authorization level can change the border lines to allow persons with authorization 1 to enter data within the production process. As shown in FIG. 1, the border lines between the authorization levels are horizontal lines drawn through the intersection points between the authorization levels. The border lines can be changed within the scheme freely. Indeed the authorization level relates to some protection level for safe operation. Basically, it is configured so that non-skilled persons cannot enter data with great influence, possibly leading to damage.

The border lines are conceptually drawn lines between the authorization levels. A moving of the border lines can be done by setting parameters in function panels in the system. In other words, a change of the authorization level will result, for example, in persons having lower authorization being allowed to enter data within an authorization level which has not been accessible to them before or reversely.

The columns in FIG. 1 concerning overview of information and alarm program only show that in all authorization levels information, for example,-about data input, quality control or production, can be printed out on a printer or shown on the monitor. Additionally, the alarm program supports the user and protects the user and machine. For example, the alarm program will inform the user if he tries to start the machine with the protective cover open, that he should close the protective cover before starting the machine.

Thus, it is possible to freely configure and display an injection cycle on the data viewing device, which is advantageously done by symbol guided selection of the individual steps of an injection cycle. This results in a hierarchical sequence which is understandable, because of the symbols employed, to users speaking various languages, thus substantially avoiding expensive, multi-language documentation for the control unit.

Figure 2A:
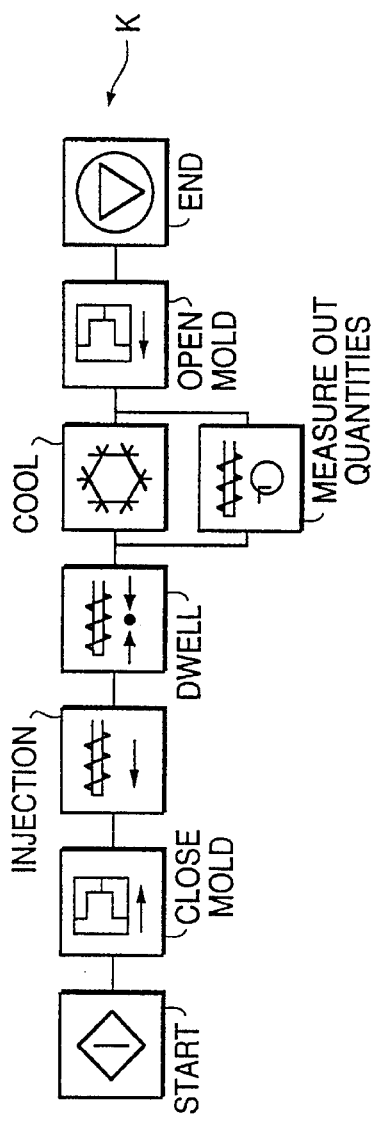
FIGS. 2a and 3 show sections of the screen showing the configuration mask.

As shown with respect to authorization stage 2, the configuration takes place under the call word "cycle sequence". The display device screen shows a display according to exemplary FIGS. 2a and 3. FIG. 2a shows a basic example of a sequence of this type. The first and last symbol of this display indicate the beginning and end of the injection cycle, respectively. The further symbols represent, from left to right, closing of the tool, injection, the pressure dwell phase, and cooling of the injection mold, with it being possible in a parallel step to simultaneously measure out the quantities to be injected in each case, and finally the tool is opened again.

Figure 2B:
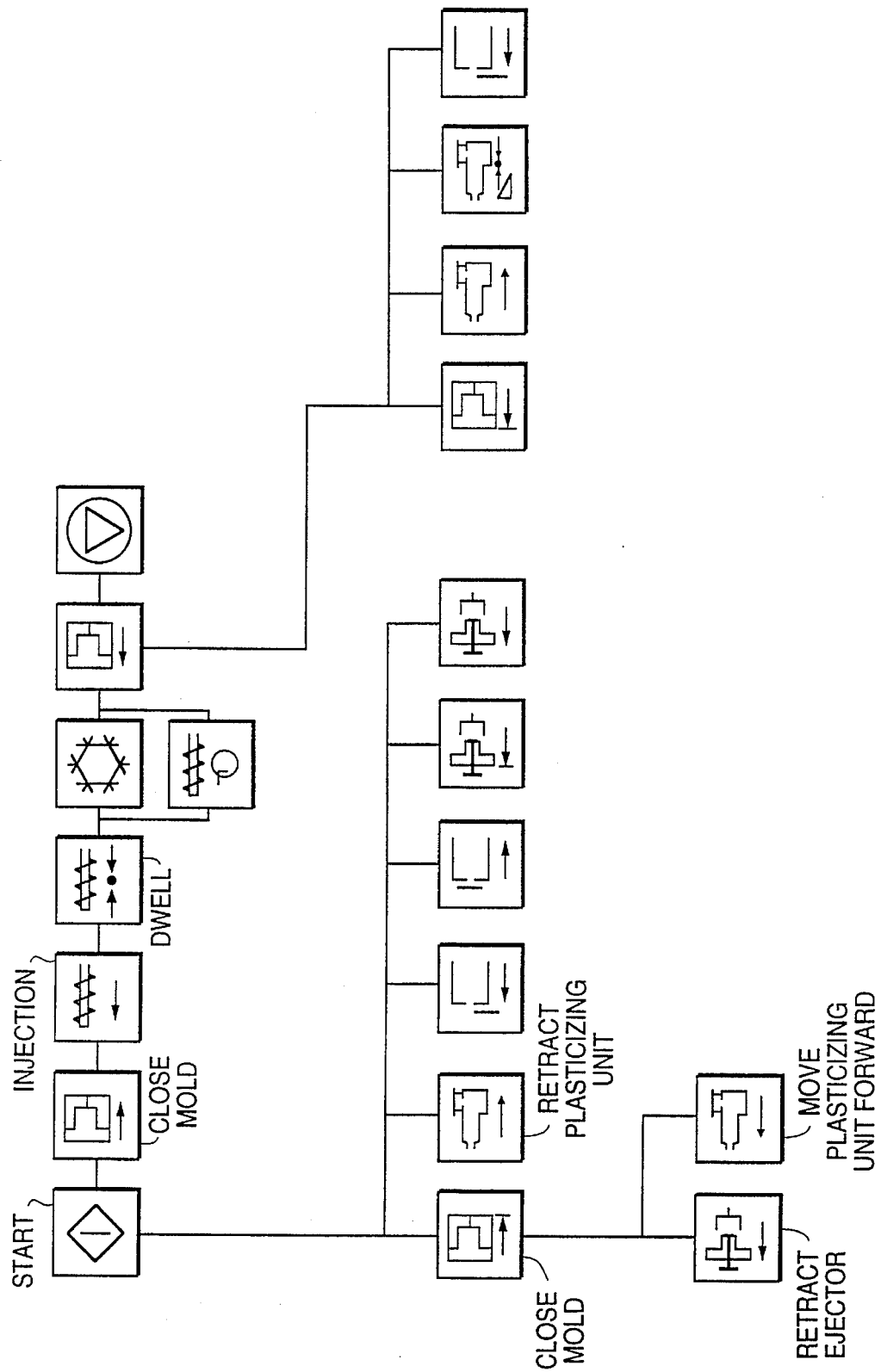

If the operator begins with the first symbol, for example, the control unit gives him a selection of symbols that are appropriate at this particular point and which could take place as the next step. In addition, the control unit requests once he has closed the tool, that he open it again some time later within the cycle. To at least this extent, there occurs a plausibility check with respect to the cyclic nature of the process. A tree structure of possible steps for the sequence of FIG. 2a is shown in FIG. 2b.

The tree structure may be, for example, a binary tree. FIG. 2b shows selection possibilities for an exemplary tree. In the first line of FIG. 2b, an injection cycle as illustrated in FIG. 2a is shown. Extending downward from and below the start block is a tree of the possibilities for a first cycle step, e.g., close mold, retract plasticization unit, etc. Below the first possibility, i.e., close mold, are two sub-possibilities, i.e.., retract ejector and move plasticization unit forward. After the user selects the first possibility, any additional steps (sub-possibilities) are available for selection.

Figure 3:
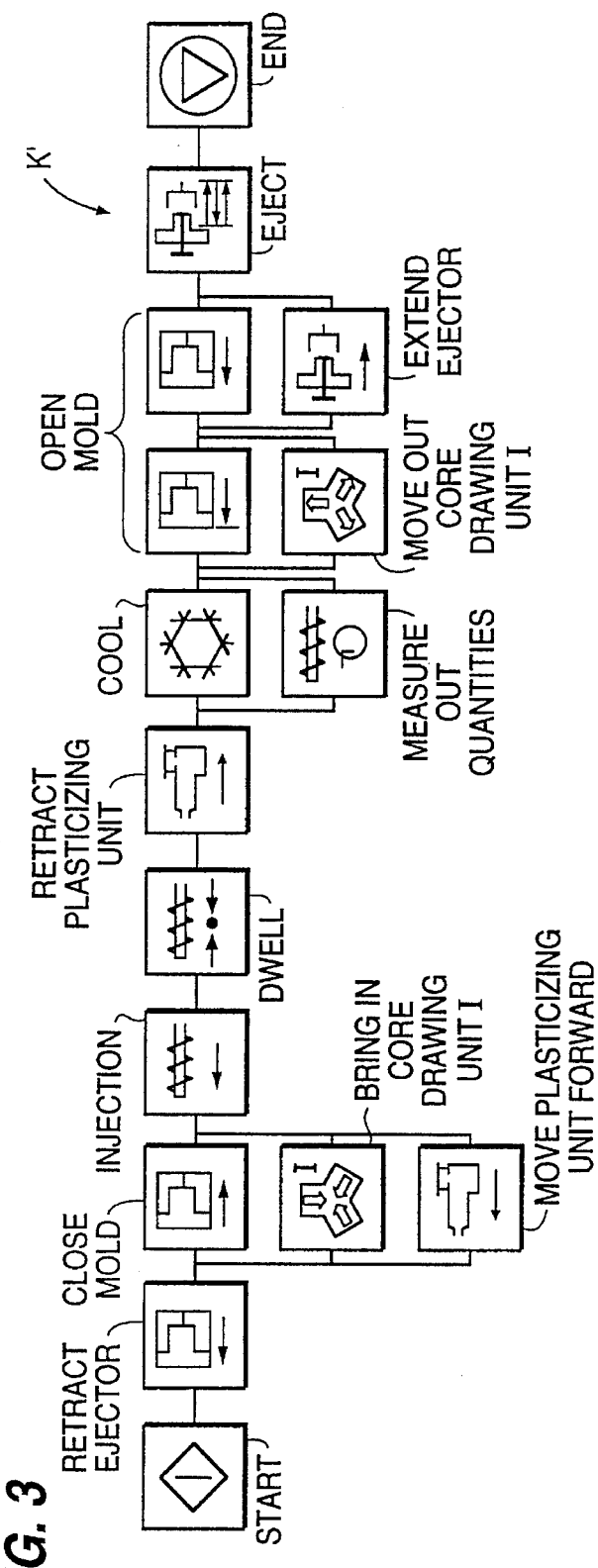

However, this does not exhaust the possibilities of control. Individual steps can be repeated several times, or performed in partial sections. For example, as shown in FIG. 3, in columns (steps) 8 and 9, the tool is initially opened only partially (step 8) and thereafter opened completely (step 9). Depending on the operator's requirements, the unit may be programmed, for example, to close the tool (mold) but leave a gap, and close it completely only after the injection process and before the pressure dwell phase.

Any desired, appropriate portions of an injection cycle that can be performed simultaneously can be configured to occur in parallel as shown, for example, in the third column of FIG. 3. There, the following steps occur simultaneously: closing of the tool; bringing in of-a tool component, namely core drawing unit I (the control unit knows how many core drawing units are available); and also the plasticization unit is moved forward during this step. During configuration of the cycle sequence, the input unit may offer further possible selections.

The control unit also checks the plausibility of successive steps and/or, looking back to already input steps, whether it is appropriate, for example, to close the tool while the ejector is still present within the mold cavity. If the operator intends to input such disallowed steps, the control unit prevents such an input because of its knowledge data base of the basic rules of injection molding.

In other words, the controller prohibits unnecessary input and checks for the reasonableness of entries. The data processing unit in the above-mentioned case uses a basic rule that the mold should not be closed during the advancement of the ejector. This is an example of one of the basic rules of injection molding referred to earlier. However, the controller may also prohibit the insertion input parameters which are not possible. For example, when the maximum injection mold opening measurement is 200 mm, it would not allow entry of a value of 350 mm.

Therefore, the user first can configure an injection cycle, wherein the system proposes only the possible alternative steps for the configuration. When the configuration is finished, the user can enter those input parameters necessary for the production of the specific molding, as for example temperature, movement, pressure, injection mass of plastic material, and so on. At this point the system controls and monitors the data input by the user. All the time the system checks whether the values entered by the user are reasonable possibilities or completely impossible. If the values are impossible, the program will not allow the entry of those values and will propose alternative values or at least give further input information.

The term plausibility means evident, understandable, believable, thinkable. A so-called plausibility check in the context of the present invention is, for example, a check whether indeed the next step of a sequence is a reasonable possibility to establish a certain cycle. Therefore, plausibility checking is checking whether steps can indeed be amended as entered by the user. It also refers to checking whether a cycle is complete. At the end of the configuration of a cycle on a first input mask, the system checks whether the cycle is indeed finished with the present input. Also the system checks whether the input parameters, as, for example, certain movements of the movable mold carrier, will allow completion of an injection cycle. In this case for example all movements of the movable mold carrier should allow the mold to close at least during the injection of plastic material. Therefore, this check is associated with or embodies, so to speak, one of the basic rules.

If one looks at the injection sequence of FIG. 3, the ejector is initially retracted then, simultaneously, the tool is closed, the core drawing unit is moved in and the plasticization unit is advanced. Then the injection takes place as well as the pressure dwell phase whereupon the plasticization unit retracts. During cooling of the injection molded object, the quantity required for the next object is simultaneously measured out and, while the tool is initially partially and then completely opened, the core drawing unit is moved out and, with the tool open, the ejector is operated, i.e., extended. Finally, at the end of the injection cycle, the injection molded objects are ejected (column 10) in multiple stages.

In summary, the setting up of the injection molding machine is effected by an interactive monitoring process, using a higher-order tree structure for monitoring the production sequence and operating parameters. This monitoring structure makes available to the user only the appropriate inputs, and expects from him the input of further data required, for example, to terminate the respective injection cycle. Any desired peripheral devices and their sequence control may also be directly incorporated in the processing steps.

As soon as the injection cycle has been interactively configured, the operator is given information about the input masks required for each one of the symbols listed in the injection cycle so that, in authorization stage 1, he is able to input his data only into these input masks, which reduces the frequency of errors. If the operator notes during the injection cycles that the input parameters do not lead to the optimum result, the control makes it possible for him to have direct access to the input mask that should be changed. For this purpose, he can actuate the respective symbol by means of cursor keys 10a and operate a soft key S which gives him access to the desired input mask. It is thus not necessary to scan all previously stored masks until the desired one is present.

The control unit may also embed the interactively configured injection cycles into an overall production sequence. For example, before the machine is able to perform an injection cycle, it must first be enabled to do so in that, for instance, the tool is heated or the oil temperature is raised to a predetermined temperature. Similarly, at the end of a charge, before the machine can be prepared for a new charge, for example, the plasticization unit must be emptied and cleaned or the temperature must be reduced. It is possible to assemble these marginal conditions within the framework of the production sequence that has been configured in authorization stage 2. This is done in the same way as described above for the injection cycle sequence, that is, initially the entire production sequence is developed on a configuration mask and then the parameters can be input to the extent necessary.

The control unit serves not only to set up the machine, but also to monitor it. After the first injection cycle, adjustments can be automatically or interactively made to optimize the injection-molding results on the basis of a comparison of the input operating parameters with the determined operating parameters. The result may be obtained in authorization stage 3 and a change made, or the control unit makes the change automatically.

Figure 4:
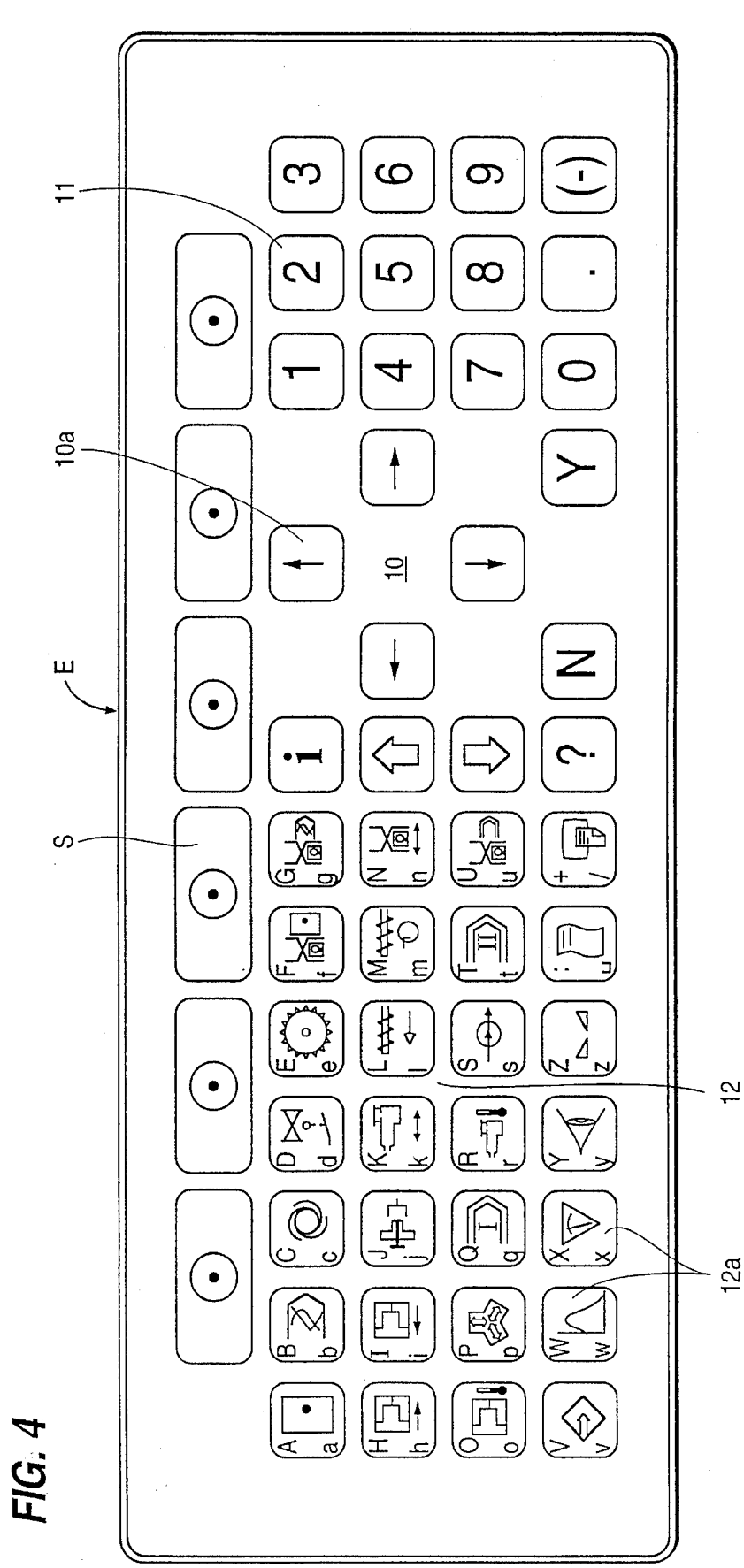
FIG. 4 shows the input unit.

For the sake of completeness, the meanings of the symbols in the keys of the exemplary keyboard block 12 of the input device as shown in FIG. 4 are explained as follows:

| | |
|---|---|
| A/a | machine settings, machine configurations |
| B/b | change program |
| C/c | automatic sequence |
| D/d | inputs/outputs |
| E/e | alarm program |
| F/f | handling sequence |
| G/g | change handling program |
| H/h | close tool |
| I/i | open tool |
| J/j | extend/retract ejector |
| K/k | advance/retract plasticization unit |
| L/l | injection |
| M/m | measure out injection material |
| N/n | move handling unit in/out |
| O/o | heating of tool |
| P/p | move tool components in/out |
| Q/q | sub-programs I |
| R/r | heating of plasticization unit |
| S/s | programmable inputs/outputs |
| T/t | sub-programs II |
| U/u | handling unit sub-programs |
| V/v | data input/output |
| W/w | graphics display on screen, pickup of measured data |
| X/x | ensuring quality |
| Y/y | monitoring function |
| Z/z | optimization |
| ; | protocol |
| + | print screen |
| i | informtaion, overview |
| ? | direct jump |

FIG. 5 illustrates an injection molding machine 501 with a control unit 502 according to the present invention. As shown, the control unit 502 includes a CPU (central processing unit) data processing unit 503, a video viewing device 504, and storage for parameters and the knowledge data base of injection molding rules 505. An optional printer 506 is also shown, as is the input device E (FIG. 4). The control unit 502 communicates with the plastics injection molding machine 501 through I/O units 507, 508, and heating regulator 509. This I/O communicates, for example, control signals to actuate machine devices and signals from sensors to monitor the processing occurring in the machine 501. The control unit components 503 to 509 and E, are advantageously interconnected by a system bus 510.

An exemplary plastics injection molding machine 501 is also illustrated in block form with various functional devices including mold closing unit 511, ejector 512, core drawing unit 513, plasticizing unit 514, nozzle mover 515, screw turn 516, cylinder heating 517, external heating 518, and peripheral devices 519. As shown in FIG. 5, peripheral devices 519 may be connected to the control unit 502. However, the control unit 502 notes whether or not a peripheral device is connected to the machine 501 and, if yes, enables the user to enter specific information about the use of the peripheral device, if necessary.

Figure 6:
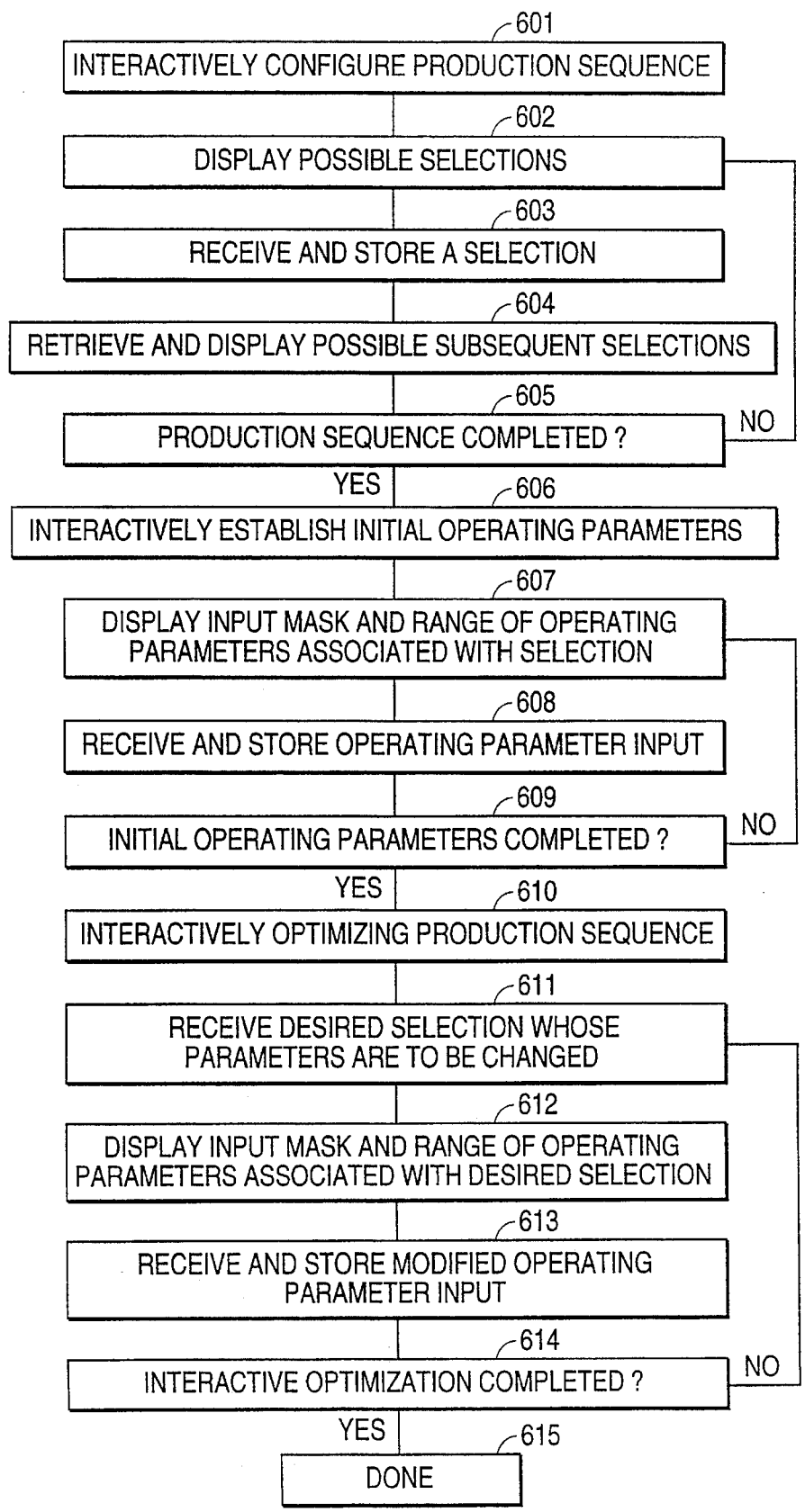
FIG. 6 is a flow chart of a method according to the invention.
Figure 7:
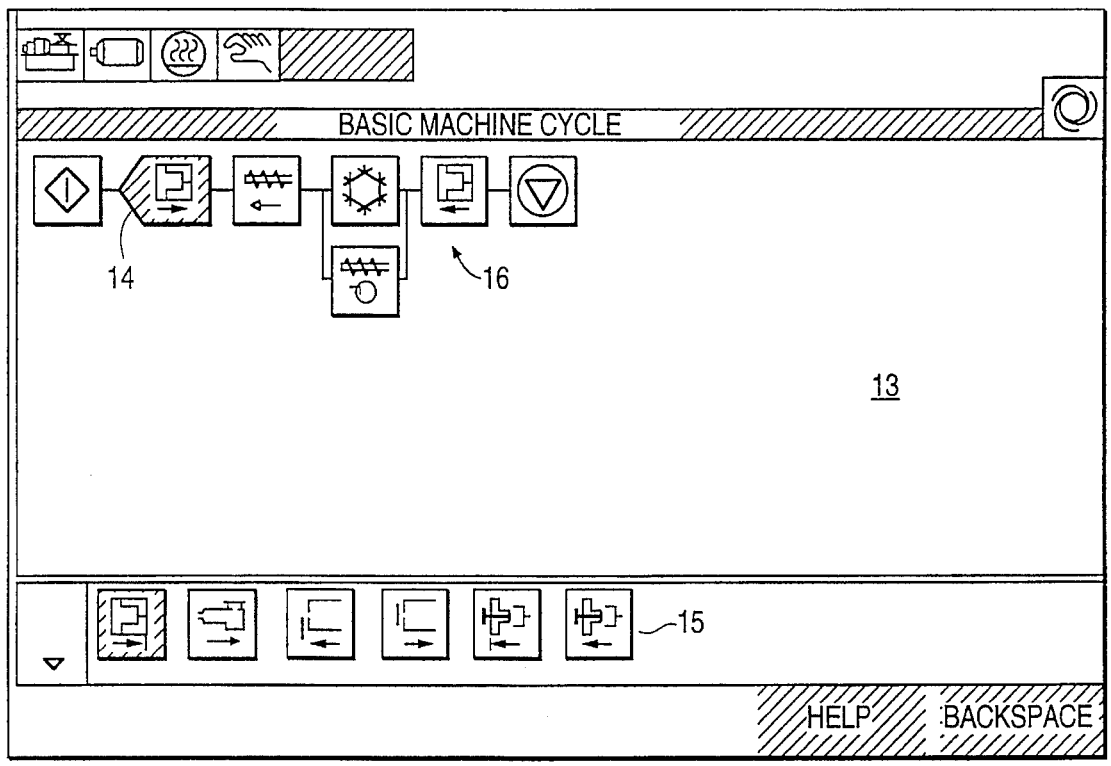
FIGS. 7 to 10 are exemplary screens for showing different operations and configurations of production cycles.

FIG. 6 is a flow chart of an exemplary embodiment of a method according to the present invention. The illustrated interactive computer based method is for setting up and controlling a plastics injection molding machine production sequence including an injection cycle, and establishing operating parameters therefor, in a plastics injection molding machine including a tool, a control unit for data processing, storage of program instructions, operating parameters, and a knowledge data base including physically possible and structurally specific production sequences and parameters associated with particular machine, tool and peripheral device configurations controlled by the control unit, an operator input device and an operator display device.

As shown in the flow chart of FIG. 6, the exemplary method begins with interactively configuring a production sequence 601. This comprises steps of displaying a menu of possible production sequence selections based on the knowledge base to an operator on the operator display device 602, receiving as input from an operator with the operator input device and storing in the control unit a production sequence selection 603, retrieving from the knowledge base possible subsequent production sequence selections consistent with previous operator selections received and stored, and displaying to an operator on the display device the possible subsequent production sequence selections retrieved in the retrieving step 604, and repeating the above steps until the interactive configuration of a production sequence is completed 605.

Next, the exemplary method interactively establishes initial production sequence operating parameters 606. This includes the steps of displaying to an operator on the display device an input mask associated with a production sequence selection and a range of acceptable operating parameters associated therewith 607, receiving as input from an operator with the operator input device and storing in the control unit operating parameter input 608, and repeating these steps until the interactive establishing of initial production sequence operating parameters is completed for each production sequence selection 609.

The illustrated exemplary method next interactively optimizes the stored completed production sequence 610. This includes the steps of receiving as input from the operator with the input device a desired production sequence selection of a completed production sequence whose operating parameters the operator desires to change 611, displaying to the operator on the display device an input mask associated with the desired production sequence selection and a range of acceptable operating parameters associated therewith 612, receiving as input from an operator with the operator input device and storing in the control unit modified operating parameter input 613, and repeating these steps until interactive optimization is completed 614, 615.

FIGS. 7 to 10 show exemplary screens illustrating different production cycles. Comparing the illustrated cycle 16 in FIG. 7, and the cycle illustrated in FIG. 2, it should be noted that both cycles are nearly identical, even if the third step (fourth block, i.e., dwell) of FIG. 2 is omitted from the cycle of FIG. 7. The user can select one of the cycle steps using the cursor. Shown at the bottom of the screen is a palette 15 of cycle steps. The step of the cycle where the cursor is located has a black background. The corresponding step in the palette 15 is likewise shown with a black background.

Figure 8:
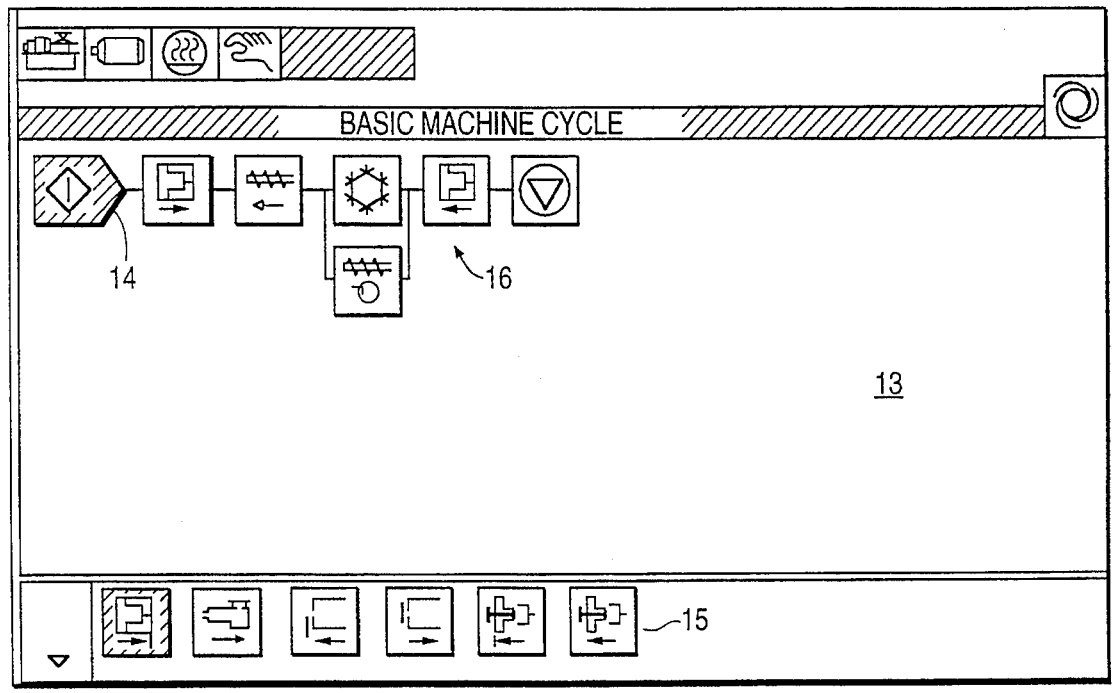

At this point the user now can direct the cursor arrow 14 to the left, right or downward direction to seek for further steps which could be amended before, after or parallel to the existing step. For example, in FIG. 7 if the user tries to find a step before the step of closing the mold clamping unit, the arrow 14 is shown pointing to the left. On the screen 13 the program proposes in the palette 15 located on the lowest line different cycle step selection possibilities, which could be added at this point into the displayed cycle 16. If the user desires to check whether these possibilities actually exist, he can move the cursor to the next step on the left and direct the arrow 14 to point to the right and, as can be seen in FIG. 8, the program proposes the same steps as in FIG. 7 in the palette 15.

Figure 9:
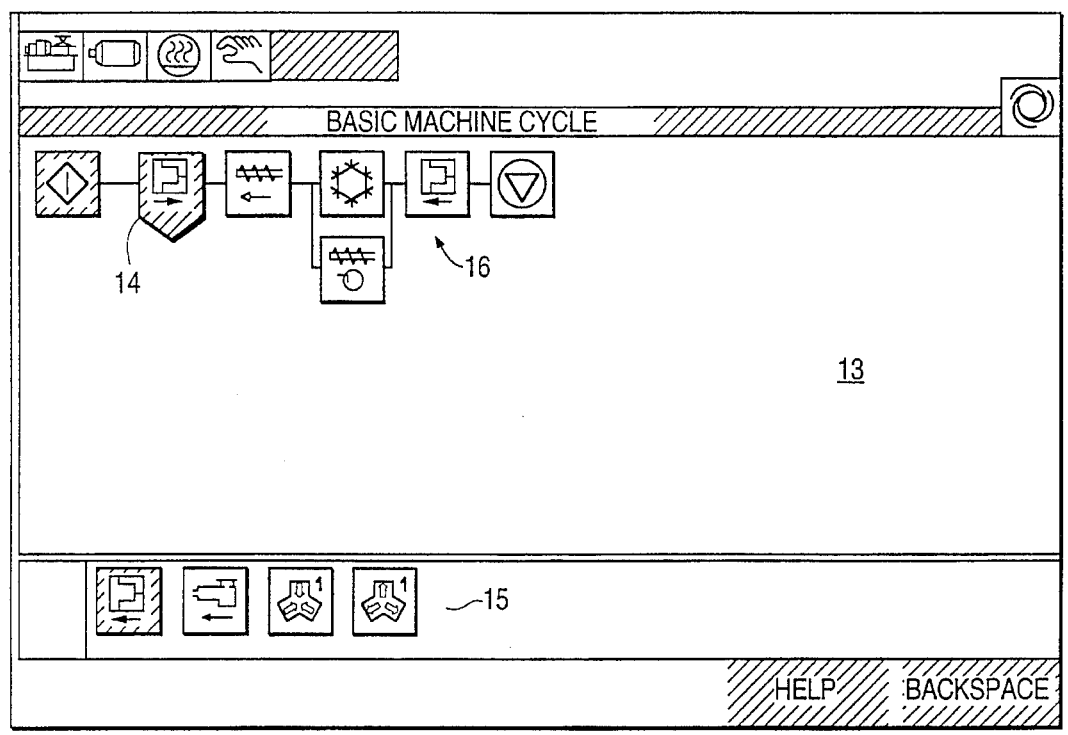
Figure 10:
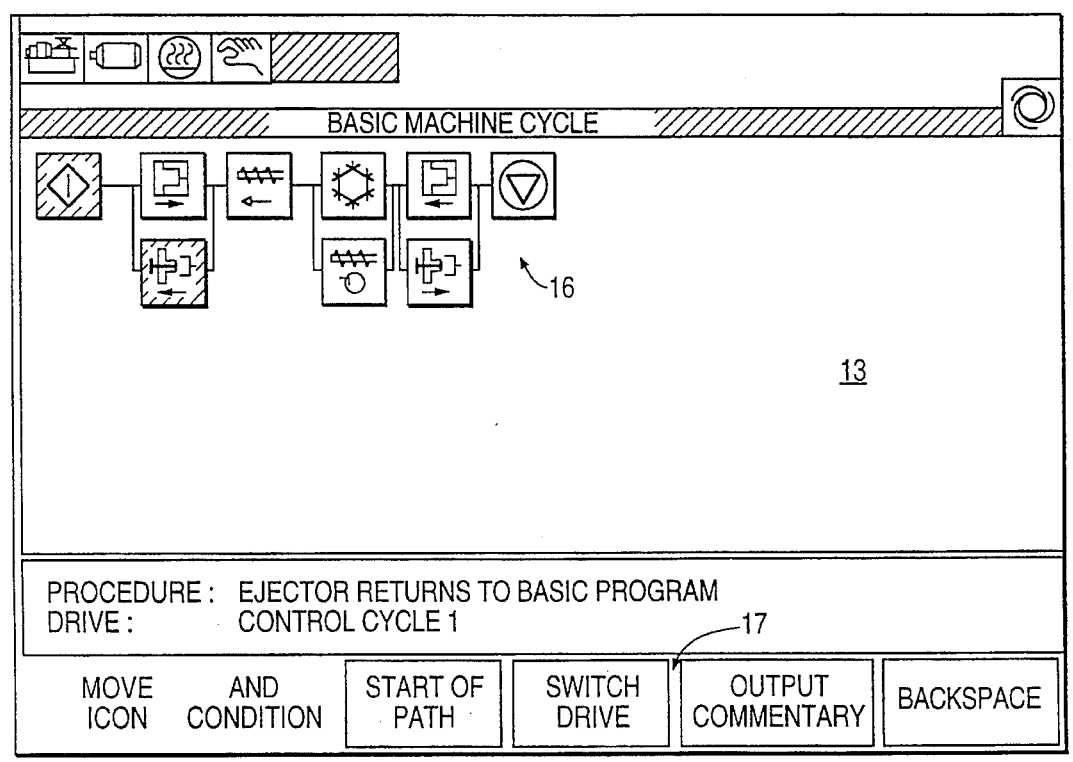

The possibility exists to insert or to add additional steps before and after one existing step, and also to establish further steps in parallel with an existing step, as can be seen from FIGS. 9 and 10. The user can now select this possibility at all steps by using the keyboard. If the user desires to add a cycle step, he moves the cursor to one of the additional steps in the palette 15 and then presses the "enter" button.

By comparison of FIGS. 9 and 10, it can be seen that the arrow 14 is directed downward and the program proposes in line 15 additional steps which can be added as parallel steps to the present step, for example, the step of retracting the ejector (shown with black background). When the user now engages the "enter" button, the program will add the step of retracting the injection unit as shown in FIG. 10. The additional line 17 in FIG. 10 shows how the soft keys S of FIG. 4 can be used. These soft keys and the keyboard as well can be used as tools for establishing an injection cycle.

It is understood that various other modifications will be apparent to and can be readily made by those skilled in the art without departing from the scope and spirit of the present invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. A computer based interactive method of controlling a plastics injection molding machine during input of portions of a production sequence and configuration of an injection cycle, which is effected essentially before the onset of the injection molding process, wherein, for a mold guided by the operator, the operating parameters required for the process sequence are input by way of an input unit into a computer based control unit storing these operating parameters and subsequently one or a plurality of injection cycles are implemented according to the stored operating parameters, the method comprising:

determining with the control unit a physically possible production sequence as well as a production sequence that is structurally specific to the machine and the tool employed, including peripheral devices associated therewith; and providing to an operator, with the control unit, a selection of possible inputs of further portions of the production sequence that can be added to the existing portions and are compatible with the machine and the tool, based on the determining step.

2. A method as defined in claim 1, wherein the determining is based on a knowledge data base of possible production sequences, injection cycles and data indicative of existing peripheral devices, stored in the control unit, and wherein the providing of the selection of possible inputs comprises displaying the selection on a data viewing device.

3. A method as defined in claim 2, wherein the determining is based on a hierarchical process sequence and wherein the displaying comprises displaying symbols representing individual steps of an injection cycle.

4. A method as defined in claim 3, wherein the displaying further comprises displaying a single configuration mask for data input on the data viewing device.

5. A method as defined in claim 4, further comprising:

receiving production sequence input selections from the operator to establish a production sequence configuration; and after input of the production sequence configuration, displaying input masks associated with the configured production sequence for operating parameter input.

6. A method as defined in claim 5, further comprising performing a plausibility check before accepting as input production sequence selections that are to take place simultaneously or successively.

7. A method as defined in claim 5, wherein, after input of a production sequence selection representing a step in an injection cycle, at least the further steps required to complete the injection cycle are displayed.

8. A method as defined in claim 5, wherein input of production sequence selections and operating parameters is monitored and constrained by a higher-order tree structure of allowed inputs.

9. A method as defined in claim 1, wherein production sequences comprising motion sequences that occur simultaneously or successively are displayed as a selection of possible inputs based on the resources available to the machine.

10. A method as defined in claim 9, wherein input of individual steps of the production sequence can be repeated in successive motion sequences.

11. A method as defined in claim 1, wherein the sequence control of any desired peripheral devices are combined as an injection molding unit production cell, including handling devices, heating devices, sorting devices and stacking devices, and can be incorporated directly in the production sequence.

12. A method as defined in claim 1, wherein the selection of possible inputs includes process phases and terminating phases whereby an overall production sequence including injection cycles can be configured and displayed on the data viewing device.

13. An interactive computer based method of setting up and controlling a plastics injection molding machine production sequence including an injection cycle, and establishing operating parameters therefor, in a plastics injection molding machine including a tool, a control unit for data processing, storage of program instructions, operating parameters, and a knowledge data base including physically possible and structurally specific production sequences and parameters associated with particular machine, tool and peripheral device configurations controlled by the control unit, an operator input device and an operator display device, the method comprising:

interactively configuring a production sequence including:
(a) displaying a menu of possible production sequence selections based on the knowledge base to an operator on the operator display device;
(b) receiving as input from an operator with the operator input device and storing in the control unit a production sequence selection;
(c) retrieving from the knowledge base possible subsequent production sequence selections consistent with previous operator selections received and stored;
(d) displaying to an operator on the display device the possible subsequent production sequence selections retrieved in the retrieving step; and
(e) repeating steps (b) to (d) until the interactive configuration of a production sequence is completed;

interactively establishing initial production sequence operating parameters, including:
(f) displaying to an operator on the display device an input mask associated with a production sequence selection and a range of acceptable operating parameters associated therewith;
(g) receiving as input from an operator with the operator input device and storing in the control unit operating parameter input; and
(h) repeating steps (f) and (g) until the interactive establishing of initial production sequence operating parameters is completed for each production sequence selection; and interactively optimizing the stored completed production sequence, including:
(i) receiving as input from the operator with the input device a desired production sequence selection of a completed production sequence whose operating parameters the operator desires to change;
(j) displaying to the operator on the display device an input mask associated with the desired production sequence selection and a range of acceptable operating parameters associated therewith;
(k) receiving as input from an operator with the operator input device and storing in the control unit modified operating parameter input;
(l) repeating steps (i) to (k) until interactive optimization is completed.

14. The method according to claim 13, further comprising comparing the input from the operator with allowed possible input based on the knowledge data base and rejecting any input which is determined to be not allowed.

15. The method according to claim 13, further comprising automatically optimizing the production sequence by monitoring and comparing actual operating parameters with the input stored operating parameters, and adjusting the stored operating parameters based on the comparing.

16. An apparatus for performing the method of claim 1, comprising:

a plastics injection molding machine including a mold; and a control unit including an input unit, a data processing unit, storage and an output device.

17. An apparatus for performing the method of claim 13, comprising:

a plastics injection molding machine including a tool;

a control unit for data processing and storage of program instructions, operating parameters, and a knowledge data base including physically possible and structurally specific production sequences and parameters associated with particular machine, tool and peripheral device configurations controlled by the control unit;

an operator input device; and an operator display device.

18. An interactive computer based method for setting up and controlling a plastics injection molding machine production sequence including at least one injection cycle, and for establishing operating parameters therefor, in a plastics injection molding machine including a tool, a control unit for data processing, storage of program instructions, operating parameters, and a knowledge data base including physically possible and structurally specific production sequences and parameters associated with particular machine, tool and optional peripheral device configurations controlled by the control unit, an operator input device and an operator display device, the method comprising:

interactively configuring a production sequence including:

(a) displaying a menu of possible production sequence selections based on the knowledge base to an operator on the operator display device;

(b) receiving as input from an operator with the operator input device and storing in the control unit a production sequence selection;

(c) retrieving from the knowledge base possible subsequent production sequence selections consistent with previous operator selections received and stored;

(d) displaying to an operator on the display device the possible subsequent production sequence selections retrieved in the retrieving step;

(e) repeating steps (b) to (d) until the interactive configuration of a production sequence is completed;

(f) displaying to an operator on the display device an input mask associated with a production sequence selection and a range of acceptable operating parameters associated therewith;

(g) receiving as input from an operator with the operator input device and storing in the control unit operating parameter input; and (h) repeating steps (f) and (g) until the interactive establishing of initial production sequence operating parameters is completed for each production sequence selection.

19. The method according to claim 18, further comprising interactively optimizing the stored completed production sequence, including:

(i) receiving as input from the operator with the input device a desired production sequence selection of a completed production sequence whose operating parameters the operator desires to change;

(j) displaying to the operator on the display device an input mask associated with the desired production sequence selection and a range of acceptable operating parameters associated therewith;

(k) receiving as input from an operator with the operator input device and storing in the control unit modified operating parameter input;

(l) repeating steps (i) to (k) until interactive optimization is completed.

* * * * *